Oct. 19, 1943.   E. WILDHABER   2,332,421
METHOD AND MACHINE FOR RELIEVING CUTTERS
Filed April 17, 1941   4 Sheets-Sheet 1

Fig. 1

Inventor
ERNEST WILDHABER
By
*R. Eshlinger*
Attorney

Oct. 19, 1943.   E. WILDHABER   2,332,421
METHOD AND MACHINE FOR RELIEVING CUTTERS
Filed April 17, 1941   4 Sheets-Sheet 2

Inventor
ERNEST WILDHABER
Attorney

Inventor
ERNEST WILDHABER
Attorney

Oct. 19, 1943.     E. WILDHABER     2,332,421
METHOD AND MACHINE FOR RELIEVING CUTTERS
Filed April 17, 1941     4 Sheets-Sheet 4

Inventor
ERNEST WILDHABER
By [signature]
Attorney

Patented Oct. 19, 1943

2,332,421

UNITED STATES PATENT OFFICE 2,332,421

METHOD AND MACHINE FOR RELIEVING CUTTERS

Ernest Wildhaber, Brighton, N. Y., assignor to Gleason Works, Rochester, N. Y., a corporation of New York Application April 17, 1941, Serial No. 389,014

11 Claims. (Cl. 51—50)

The present invention relates to the relief-grinding of the side surfaces of face-mill gear cutter blades.

There are several different processes known for the relief-grinding of the side surfaces of face-mill gear cutter blades. One of the most widely used is the axial relieving process in which the cutter blades are relief-ground in their own head with a rotary grinding wheel by effecting a relative helical motion between the wheel and head once for each blade to be ground. Another process, which has been extensively employed, is the so-called "offset grinding" process. In this process, the blades, which are to be relief-ground, are mounted in a dummy head to extend in a direction generally parallel to the axis of the dummy head but to be non-radial of that axis so that corresponding side surfaces at one side of the blades will lie in a common surface of revolution coaxial of the dummy head, and the relieving operation is effected by simply rotating the dummy head to pass the side surfaces of the blades across the rotating wheel.

In my co-pending application, Serial No. 388,229, filed April 12, 1941, now Patent No. 2,308,734, issued January 19, 1943, I have disclosed a method of relief-grinding face-mill gear cutter blades, particularly blades having curved profiles, in which the blades are mounted in a dummy head so that they are tilted forward from their cutting positions and have their tip surfaces lying in a plane perpendicular to the axis of the dummy head, and in which the side surface of a blade is relief-ground by rotating the dummy head past a rotating grinding wheel while simultaneously moving the wheel axially so as to compensate for and offset the change in pressure angle which would normally result from grinding the blade in tilted position.

The axial relief-grinding method cannot be employed for the relief-grinding of blades of zero or very low pressure angle. The known method of "offset grinding" cannot be employed for the relief-grinding of blades of curved profile or of the so-called "Toprem" type where each blade has a side-cutting edge of two different pressure angles.

One object of the present invention is to provide a simple yet practical method for relief-grinding face-mill cutter blades of zero or quite low pressure angle.

A further object of the invention is to provide a new and improved method for the relief-grinding in an offset head of blades of curved profile, or broadly, blades having profiles which at different portions in the height of the blades are of different inclinations, such as blades of the "Toprem" type.

Another and most important object of the present invention is to provide a relief-grinding machine on which face-mill gear cutter blades may be ground either according to the processes of the present invention or according to the process of my prior application above mentioned.

Still another object of the invention is to provide a machine for relief-grinding face-mill gear cutter blades on which practically any known process of relief-grinding such blades may be practiced and which accordingly will be capable of such a wide range of use as to be practically universal in character.

Other objects of the invention will be apparent hereinafter from the specification and from the recital of the appended claims.

Reference will be had first to Figs. 1 to 5 inclusive which illustrate the construction and operation of the novel relief-grinding machine of the present invention. This machine is provided with two grinding wheels, one for relief-grinding the outside surfaces of the blades and the other for relief-grinding the inside surfaces of the blades. These two grinding wheels are denoted at W and W', respectively. The work spindle of the machine is denoted at 25. The blade-carrying head, which may be either the actual cutting head or a dummy head, is secured to this spindle by any known or suitable means.

Figure 1:
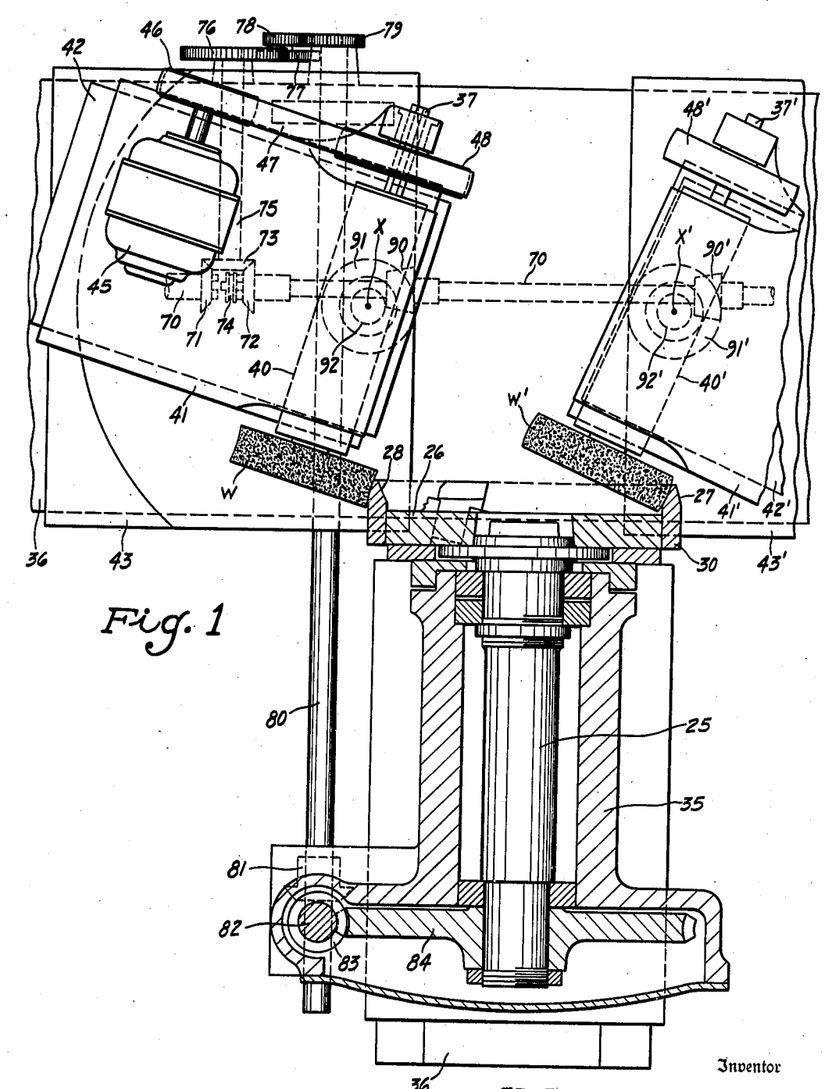
Fig. 1 is a part section, part plan view, showing somewhat diagrammatically the construction of a face-mill gear cutter relieving grinder built according to one embodiment of this invention and illustrating the use of this grinder in the relieving of the side surfaces of the blades by the process of my copending application above mentioned.

The work spindle 25 is suitably journaled in a support or head 35 which is mounted on the base 36 of the machine for sliding adjustment in the direction of the axis of the work spindle. The grinding wheels W and W' are secured to wheel spindles 37 and 37', respectively. These spindles are journaled in sleeves 40 and 40', respectively. The sleeves 40 and 40' are mounted in heads or supports 41 and 41', respectively, for reciprocation axially of their respective wheel spindles, and the wheel spindles are so mounted as to reciprocate with their respective sleeves. The mountings and operation of the two spindles are identical and only the mounting and operation of the spindle 37 will be specifically described. Parts employed in the mounting and operation of the spindle 37', which correspond to those employed for the spindle 37, are denoted by the same reference numerals as used for the spindle 37 except that the numerals are primed.

The head 41 is mounted on a swivel member 42 for linear adjustment in a direction at right angles to the axis of the spindle 37. The swivel member 42 is mounted on a slide 43 for angular adjustment about an axis X extending at right angles to the axis of the wheel spindle. The slides 43 and 43' are mounted on the base 36 for lateral adjustment toward and from one another.

The sliding adjustment of the head 41 on the swivel member 42 permits of varying the setting of the wheel to compensate for change in its diameter. The angular adjustment of the swivel member 42 on the slide 43 permits of setting the grinding wheel in accordance with the pressure angle of the blade surface to be ground. The lateral adjustment of the slide 43 on the base 36 permits of spacing the grinding wheels in accordance with the diameter of the head in which the blades that are to be ground are mounted.

The wheel spindle 37 is driven from a motor 45 that is mounted on the head 41. The drive is through the pulley 46, belt 47 and pulley 48. The pulley 46 is mounted on the armature shaft of the motor 45, and the pulley 48 has a splined connection with the wheel spindle 37.

In Fig. 1, the machine is shown arranged for relief-grinding by the process of my prior application above mentioned the side surfaces of blades 30 of a spherical type face-mill gear cutter. For this purpose, the blades are mounted in a dummy head 26 so that they are tilted forwardly out of cutting position by the amount of the top clearance angle of the blades, and the tips of the blades all lie in a plane perpendicular to the axis of the work spindle 25. The wheel W for grinding the outside surfaces 27 of the blades is dressed to concave circular arcuate profile shape, while the blade W' for grinding the inside surfaces 28 of the blades is dressed to convex circular arcuate profile shape.

For the relief-grinding operation, the work spindle 25 is rotated on its axis past the rotary grinding wheels while the wheels are reciprocated axially. The axial reciprocation is effected in time with the rotation of the work spindle, and, during a revolution of the work spindle, occurs once for each blade to be ground. The axial movement of each wheel is in one direction during actual grinding of a side surface of a blade and in the opposite direction, when the relieving action is completed, in order to return the wheel to initial position ready for relieving the next blade.

In the machine illustrated, the axial reciprocation of the grinding wheels is effected by movement of the sleeves 40 and 40' axially in the heads 41 and 41'. The reciprocatory movement of the sleeve 40 is produced by a cam 50 (Figs. 2 and 3) which is mounted to rotate on the axis X. The peripheral surface of the cam engages a bar 51 which is pivotally mounted at its two ends on pins 52 and 53, respectively, which are carried by arms 54 and 55, respectively. The arms 54 and 55 are journaled in the head 41 by integral trunnions 56 and 57, respectively.

Figures 2, 4, 5:
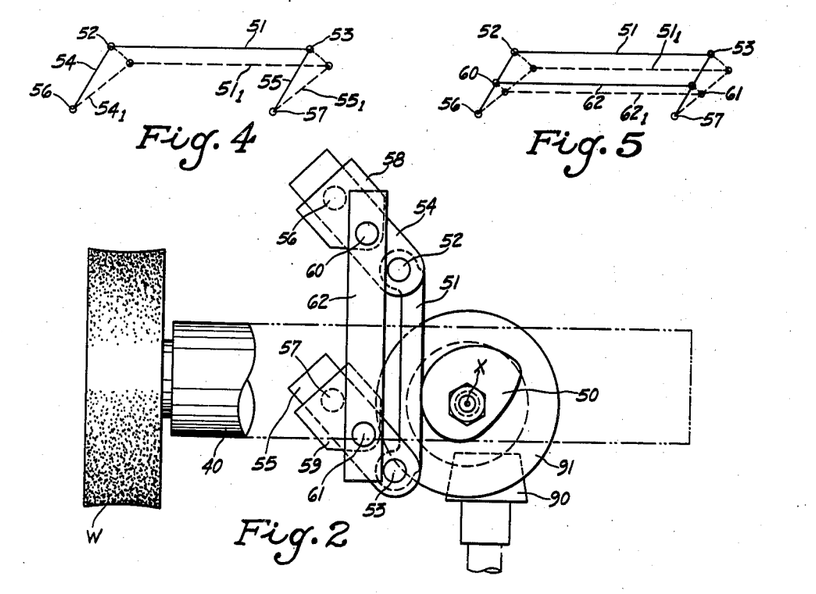
Fig. 2 is a somewhat diagrammatic view showing the type of mechanism employed on this machine for reciprocating each grinding wheel.
Figs. 4 and 5 are diagrammatic views further illustrating the operation of the reciprocating mechanism.
Figure 3:
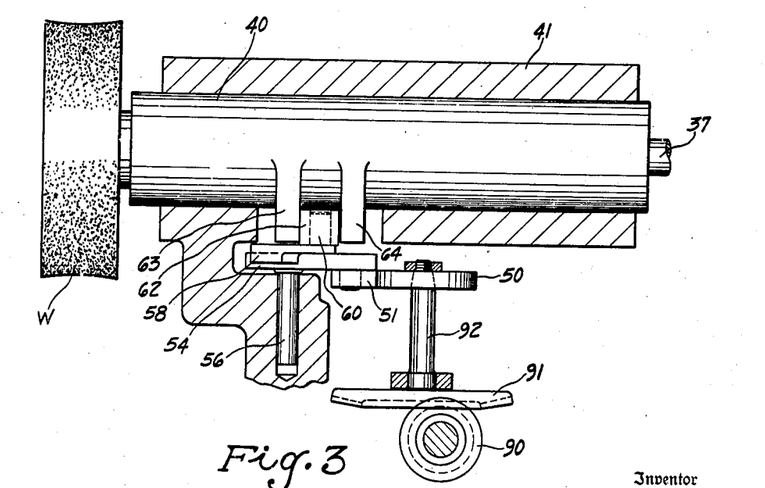
Fig. 3 is a sectional view taken at right angles to the view of Fig. 2 and further illustrating the mechanism for reciprocating a wheel.

Mounted on the arms 54 and 55 for sliding adjustment thereon are plates 58 and 59, respectively. Pivotally connected to the plates 58 and 59 by means of pins 60 and 61, respectively, is a bar 62. This bar is adapted to engage between two lugs 63 and 64 formed integral with the sleeve 40. With the construction described, as the cam 50 rotates, sliding movement is imparted to the sleeve 40 to reciprocate the sleeve in the head 41.

The bars 51 and 62 are parallel to one another and through their pivotal connections form a parallelogram type linkage.

As illustrated diagrammatically in Fig. 4, as the cam 50 rotates on its axis, the arms 54 and 55 are moved about the trunnions 56 and 57 from the full line positions shown in this figure to the dotted line positions denoted at $54_1$ and $55_1$, respectively, and the bar 51 is thus moved from the full line position, shown in this figure, to the dotted line position $51_1$. Now during this movement of the bar 51 from full line position to the dotted line position denoted at $51_1$, the bar 62 will also be swung about the trunnions 56 and 57, as shown in Fig. 5, moving from the full line position denoted at 62 to the dotted line position $62_1$. It will be noted, however, that since the bar 62 is at a smaller radial distance from the trunnions 56 and 57 than the bar 51, the bar 62 will have a smaller amount of displacement than the bar 51. Thus while the cam 50 moves the bar 51 the distance between the positions 51 and $51_1$, the actual axial movement transmitted to the sleeve 40 will be the distance between the full line position at 62 and the dotted line position at $62_1$ of the bar 62. By slidably adjusting the plates 58 and 59 on the arms 54 and 55, respectively, the amount of movement of the bar 62 can be adjusted, and thereby the stroke of the wheel spindles 37 and 37' can be varied.

The two cams for reciprocating the sleeves 40 and 40' are driven in time with the rotation of the work spindle as already described. The timed relation of these several parts may be derived from a shaft 70, which may be driven from any suitable source of power. The shaft 70 may drive the work spindle 25 selectively in either direction through the bevel gears 71 and 73 or the bevel gears 72 and 73 through engagement of the sliding clutch 74 with gear 71 or gear 72. The gear 73 is secured to a shaft 75. There is a spur gear 76 secured to the outer end of the shaft 75, and this spur gear forms one of a set of change gears, of which the other members are denoted at 77, 78 and 79. These spur gears serve to transmit power from the shaft 75 to a shaft 80, the spur gear 79 being secured to the upper end of this latter shaft. There is a bevel gear 81 secured to the lower end of the shaft 80 which meshes with a bevel gear that is fastened to a shaft 82. There is a worm 83 integral with the shaft 82 and this worm meshes with a worm wheel 84 which is keyed or otherwise secured to the work spindle 25.

Mounted on the shaft 70 are a pair of hypoid pinions 90 and 90′. These mesh with the hypoid gears 91 and 91′, respectively, which are secured to shafts 92 and 92′, respectively, on which the control cam 50 for the sleeve 40 and its counterpart for the sleeve 40′, respectively, are mounted.

Through the mechanism described, then, the blade-carrying head 26 may be rotated in time with the axial reciprocation of the sleeves 40 and 40′, and the grinding wheels may be rotated on their own axes in engagement with the sides of the blades, to effect the relief-grinding operation.

Aside from the relief-grinding method of my copending application above mentioned, the machine of the present invention may be employed for practicing a wide variety of processes for relief-grinding face-mill gear cutter blades. Some of the methods which may be employed on the relieving machine of the present invention are illustrated diagrammatically in Figs. 6 to 21 inclusive.

Figs. 6 to 12 inclusive illustrate various methods of relief-grinding that may be employed where the cutting blades are ground in their own head. In the several relief-grinding processes illustrated in these figures, the blades B are mounted, as illustrated in Fig. 13, in slots 100 which are radial of the axis 101 of the blade carrying head 102, and the blades B extend in the direction of the axis 101. Fig. 13 shows only a fragment of the head 102, and a single blade B mounted therein. The slots 100 at either side of the slot, in which the blade is mounted, are empty, for ordinarily only alternate blades can be ground at one time.

Figure 6:
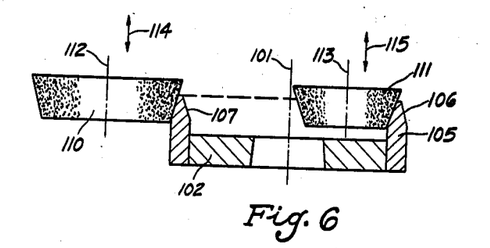
Figs. 6 to 12 inclusive are diagrammatic views illustrating various methods that may be employed for relief-grinding face-mill gear cutter blades on the present machine, where the blades are to be relief-ground in their own head.

Fig. 6 shows one way in which the machine may be employed for axially relieving the side surfaces of blades 105 whose outside and inside surfaces 106 and 107, respectively, are of straight profile. Here conical grinding wheels 110 and 111 are employed for grinding the outside and inside surfaces, respectively, of the blades, and the swivel members 42 and 42′ are adjusted so that the axes 112 and 113, respectively, of the wheels will be parallel to the axis 101 of the blade-carrying head 102. The relief-grinding operation is effected by rotating the wheels on their axes, and the head on its axis 101 while reciprocating the wheels axially as denoted by the arrows 114 and 115 in time with the rotation of the head. The wheels will reciprocate once for each blade ground, the axial movement being in one direction, during the relieving of a blade, and in the opposite direction, when the relieving action is completed, to return the wheel to initial position ready for the relieving of the next blade.

Figure 7:
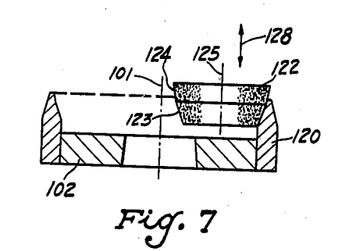

Fig. 7 illustrates a method for axially relief-grinding the inside surfaces of blades 120 of a "Toprem" type cutter. The inside surfaces of such blades have a double pressure angle, that is, the lower part of the inside blade profile is inclined at one angle to the axis of the cutter and the upper part is inclined to said axis at a different and lesser angle. For the grinding of such blades, a grinding wheel 122 may be employed which is dressed to a double pressure angle corresponding to the profile shape of the inside surfaces to be ground. The wheel is dressed to one pressure angle for the portion 123 of its height and to a different and lesser pressure angle for the portion 124 of its height, the difference in pressure angles for the two parts of the wheel profile corresponding to the difference in pressure angles between the lower and the upper portions of the inside surfaces of the blades. The wheel is adjusted so that its axis 125 is parallel to the axis 101 of the blade-carrying head 102. Relief-grinding is effected by rotating the wheel and head on their respective axes while reciprocating the wheel in the direction of its axis, as indicated by the arrow 126, once per blade to be ground on a revolution of the head 102. The wheel is moved axially in one direction during the relieving of a blade and in the opposite direction when the blade has been relieved to return the wheel to initial position ready for the grinding of the next blade. While Fig. 7 illustrates the relief-grinding of inside blades of the "Toprem" type, it will be understood that outside blades of this type may be similarly relieved.

Figure 8:
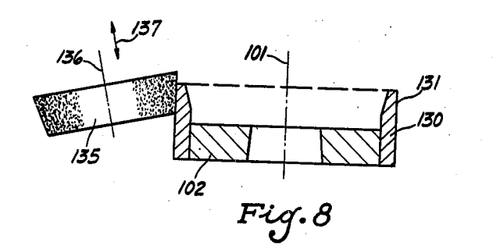

Fig. 8 illustrates a novel method, which may be practiced on the machine of the present invention, for the relief-grinding of blades having side surfaces of zero or low pressure angle. The blades 130 shown in the drawings have outside surfaces 131 of zero pressure angle extending parallel to the axis 101 of the head 102 in which the blades are mounted. It will be obvious that such side surfaces cannot be axially relieved, for axial relief would not produce any cutting clearance. With the machine of the present invention, it is possible, however, to produce a combined axial and radial relief in a single operation which will provide sufficient cutting clearance. Such relief may be achieved by using a conical grinding wheel such as shown at 135. The wheel is dressed at such an angle that its effective profile will extend parallel to the axis 101 of the blade-carrying head, that is, will extend in the direction of the profile of the blades to be ground. The axis 136 of the wheel will therefore be inclined to the axis 101 of the cutter head. Hence, when the wheel is moved axially as denoted by the arrow 137, there will be a component of this motion in a direction radial of the axis 101 of the cutter head. Hence, the side surfaces ground on the blades will have a combined axial and radial relief. As before, the wheel and head are rotated on their axes and the wheel is reciprocated axially in time with the head rotation once for each blade to be ground. The movement of the wheel will be in one direction during the actual grinding of the blade and in the opposite direction when a side surface has been relieved, in order to return the wheel to initial position ready for the grinding of the next blade.

Figure 9:
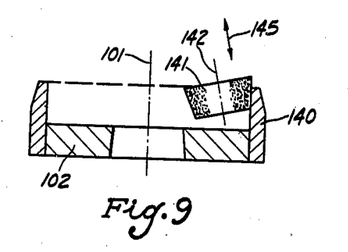

Fig. 9 shows the novel method as applied to the relief-grinding of the inside surfaces of blades 140 whose inside surfaces are of zero pressure angle. A conical grinding wheel 141 is used whose axis 142 is so inclined to the axis 101 of the blade-carrying head 102 that the active profile of the wheel will extend in the direction of profile of the inside surfaces of the blades, that is, be parallel to the axis 102 of the cutter head. The relieving operation is effected, as before, by rotating the head and wheel on their respective axes and producing a reciprocating motion of the wheel in the direction of the axis as denoted by the arrow 145. As before, because of the inclination of the axis of the grinding wheel, a combination radial and axial relief will be produced.

Figure 10:
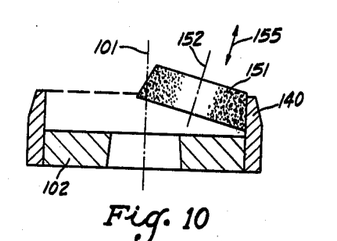

Fig. 10 illustrates a modified method of relief-grinding blades 140 whose inside surfaces are of zero pressure angle. A conical grinding wheel 151 is used but the axis 152 of this wheel is inclined outwardly with reference to the axis 101 of the cutter head 102, instead of inwardly as shown in Fig. 9. The relief-grinding is effected by rotating the cutter head 102 and wheel 151 on their respective axes while reciprocating the wheel axially once per blade to be ground as denoted by the arrow 155. Here again the relieved inside surfaces of the blades will have a combination radial and axial relief. In the method illustrated in Fig. 10, however, the wheel moves outwardly during the relieving operation if the blade is relieved from front to rear whereas in the method illustrated in Fig. 9, the wheel is moved inwardly during relieving if the blade is relieved from front to rear.

Figure 11:
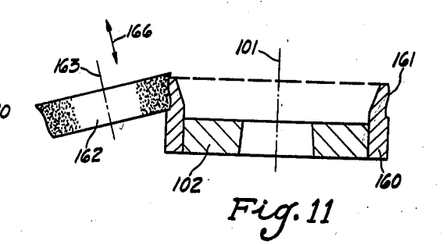

Fig. 11 shows a method for relief-grinding blades of curved profile such as may be used for the cutting of varying-leverage gears according to the process of my copending application No. 395,072, filed May 24, 1941. Fig. 11 shows the relieving of the outside blades of this cutter. Here the blades 160 have outside surfaces 161 which are of compound profile curvature, being concave for a portion of their height and convex for the rest of their height. These blades are adapted to finish-cut at only one point in their height and at that point they are of zero or substantially zero pressure angle. Hence the blades require radial relief. This can readily be produced on the machine of the present invention by using a grinding wheel, such as shown at 162, which is dressed to a profile shape corresponding to the shape to be ground on the outside surfaces 161 of the blades. This wheel is adjusted so that its axis 163 is inclined to the axis 101 of the cutter head 102. Relief-grinding is effected as before by rotating the wheel and cutter head on their respective axes and reciprocating the wheel axially as indicated by the arrow 166. This reciprocating movement is, as before, in time with the rotation of the cutter head and occurs once for each blade to be ground, being in one direction during the grinding of the side surface of a blade and in the opposite direction when the side surface has been completed in order to return the wheel to initial position ready for the grinding of the next blade. Because the axial movement of the wheel is in a direction inclined to the axis of the cutter head, the outside surfaces of the blades will have a combined radial and axial relief and therefore have the cutting clearance required.

Figure 12:
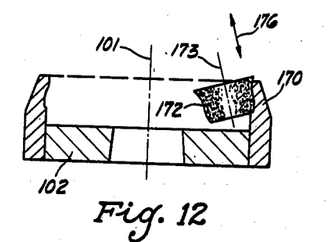
Figure 13:
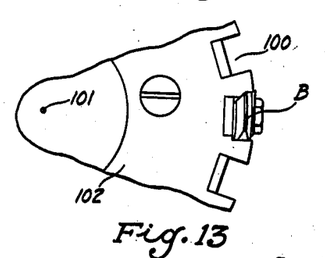
Fig. 13 is a fragmentary plan view showing the position of the blades when mounted in their own head for such relief-grinding operations.

Fig. 12 shows how the machine of the present invention may be employed for the grinding of the inside blades 170 of a cutter for cutting varying-leverage gears according to the process of my application No. 395,072 above mentioned. Here a grinding wheel 172 is used which is dressed to a profile shape corresponding to the profile shape to be produced on the blades. This wheel is adjusted so that its axis 173 is inclined to the axis 101 of the cutter head 102. Relief-grinding is effected by rotating the wheel and cutter head on their respective axes and reciprocating the wheel in the direction of its axis, as indicated by the arrow 176 in accordance with the principle already described with reference to Fig. 11.

Figs. 14 to 19 inclusive illustrate various methods which may be employed for relief-grinding face-mill gear cutter blades on the machine of the present invention where the cutter blades are mounted in a dummy head to extend in the direction of the axis of said head but in offset position, that is, non-radially of the axis of that head.

Figure 18:
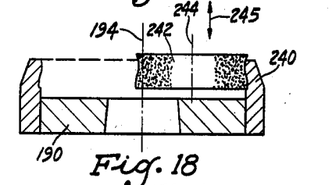
Figure 19:
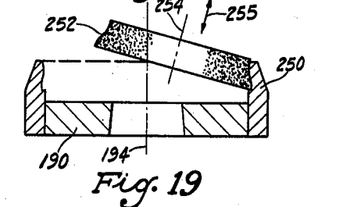
Figure 20:
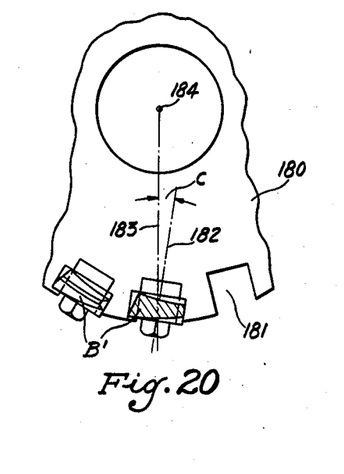
Figs. 20 and 21 are fragmentary diagrammatic plan views showing, respectively, how the blades are mounted in different dummy heads for relief-grinding the outside and inside blade surfaces, respectively, according to any of the processes illustrated in Figs. 14 to 19 inclusive.

When the outside surfaces of the blades B' are to be ground by any of the methods illustrated in Figs. 14 to 19 inclusive, each blade is mounted in a dummy head such as denoted at 180 in Fig. 20. This head is provided with non-radial blade slots 181, the center line 182 of each slot being inclined at an angle C to line 183 radial of the axis 184 of the dummy head. The angle C is determined by the clearance angle which it is desired to produce on the side surfaces of the blades.

Figure 21:
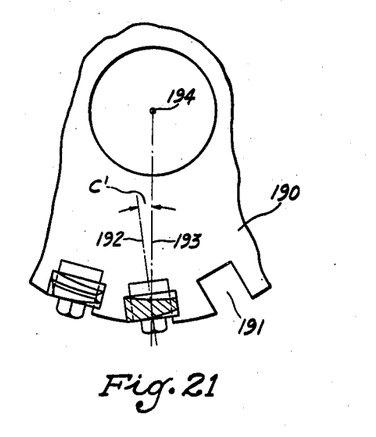

For relief-grinding the inside surfaces of the blades according to any of the processes illustrated in Figs. 14 to 19 inclusive, a dummy head, such as shown at 190 in Fig. 21, is employed. This head has blade slots 191 which are non-radial of the axis 194 of the dummy head. Each slot of the dummy head 190 has its center line 192 inclined at an angle C' to a line 193 radial of the axis 194 of the head. The angle C' is determined by the clearance angle desired on the inside surface of the blades. In the dummy head of either Fig. 20 or Fig. 21, all blades extend in the general direction of the axis of the head and all of the blades, both inside and out, can be relieved simultaneously.

Figures 14, 15:
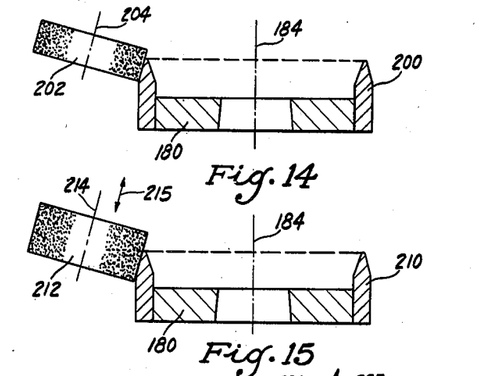
Figs. 14 to 19 inclusive are diagrammatic views showing different methods that may be employed on the machine of this invention for the relief-grinding of face-mill gear cutter blades when the blades are mounted in a dummy head in offset, that is, non-radial position.

Fig. 14 illustrates how the machine of the present invention may be employed for relief-grinding the outside surfaces of face-mill gear cutter blades according to the known "offset" grinding process. Here the blades 200 to be ground are mounted in a dummy head 180, such as shown in Fig. 20, and a cylindrical grinding wheel 202 is employed. The grinding wheel 202 is inclined to the axis 184 of the dummy head in accordance with the pressure angle of the blade surfaces to be ground. For the relief-grinding operation, the wheel and head are simply rotated on their respective axes 204 and 184. No other motion is required.

Fig. 15 illustrates how the machine of the present invention may be employed for relief-grinding the outside surfaces of cutter blades according to a modification of the known "offset grinding" process. Here the blades 210, whose outside surfaces are to be ground, are again mounted in a dummy head 180 and again a cylindrical grinding wheel is employed. The cylindrical grinding wheel 212 is adjusted so that its axis 214 is inclined to the axis 184 of the dummy head at the pressure angle of the blade surfaces to be ground. In the relieving operation, the dummy head 180 and wheel 212 are rotated on their respective axes and in addition a reciprocating movement is effected axially of the wheel. This reciprocating movement, which is denoted by the arrow 215, is provided for the purpose of producing a fine finish on the side surfaces of the blades and is preferably so timed to the cutter rotation that the number of axial strokes of the grinding wheel is prime to the number of blades in the dummy head.

Figure 16:
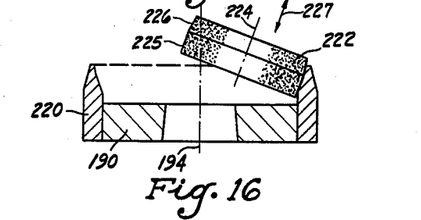

Fig. 16 shows how the machine of the present invention may be employed to practice a novel method for relief-grinding blades of the "Toprem" type. This figure shows the grinding of the inside surfaces of blades having inside cutting edges of two different pressure angles. The blades 220 to be ground are mounted in a dummy head 190 such as that shown in Fig. 21. The grinding wheel 222, which is employed, is dressed to have a profile, in the instance shown which is straight and parallel to the axis 224 of the wheel for the portion 225 of its height and which is inclined to the axis of the wheel for the portion 226 of its height. The portions 225 and 226 of the profile of the wheel are inclined to one another in correspondence with the inclination of the two portions of the profile of the inside surfaces of the cutting blades to be ground. For the relief-grinding operation, wheel and dummy head are rotated on their respective axes 224 and 194 and simultaneously an axial reciprocating motion is imparted to the wheel as denoted by the arrow 227. This reciprocating motion is in time with the rotation of the head 221 and occurs once for each blade to be ground, the motion being in one direction during actual relief-grinding of the side surface of a blade and in the opposite direction at the end of the relieving operation to permit of return of the wheel to initial position ready for relieving the next blade.

Figure 17:
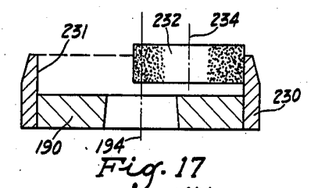

Fig. 17 illustrates how the machine of the present invention may be employed for the relief-grinding of the inside surfaces 231 of blades 230 whose inside surfaces are of zero pressure angle. A cylindrical grinding wheel 232 is used and the wheel is so adjusted that its axis 234 is parallel to the axis 194 of the dummy head. For the relief-grinding operation, the wheel and dummy head are simply rotated on their respective axes. No axial motion of the wheel is required. Due to the non-radial arrangement of the inside surfaces of the blades in the dummy head, radial relief will be produced on the side surfaces of the blades back of their cutting edges to provide the required cutting clearance.

Figs. 18 and 19 illustrate two novel ways in which the machine of the present invention may be employed for the relief-grinding of the inside surfaces of blades of compound curvature such as may be used in cutting varying-leverage gears according to the invention of my co-pending application, Serial No. 395,072, above mentioned. In both cases, a grinding wheel is employed which has its active surface dressed to a profile shape corresponding to the shape which it is desired to produce on the inside surfaces of the blades.

In the method illustrated in Fig. 18, the wheel 242 is adjusted so that its axis 244 is parallel to the axis 194 of the dummy head 190 in which the blades 240 that are to be ground are mounted. Relief-grinding is here effected by rotating the dummy head and wheel on their respective axes while moving the wheel axially. The wheel is reciprocated, as indicated by the arrow 245, in time with the rotation of the dummy head, the wheel being moved axially in one direction during the actual grinding of the side surface of a blade and being moved axially in the opposite direction at the end of each grinding operation to return the wheel to initial position. The axial movement is required to insure that the same profile curvature will be produced on the side surface of the blades at all points of the length of the blades from front to rear so that the blades may have the same shape after sharpening as when new.

In the process illustrated in Fig. 19, the wheel 252 used is adjusted so that its axis 254 is inclined to the axis 194 of the dummy head 190 in which the blades 250 that are to be ground are mounted. Here again, relief-grinding is effected by rotating the wheel and dummy head on their respective axes while effecting axial movement of the wheel. As before, the wheel is reciprocated axially, as denoted by the arrow 255, once for each blade to be ground, the axial movement being in one direction during actual relieving of the side surface of a blade and being in the opposite direction when the relieving of the side surface has been completed in order to return the wheel to initial position ready for grinding the next blade. As in the methods illustrated in Figs. 16 and 18, the axial movement of the wheel in the method shown in Fig. 19 is for the purpose of producing the same profile shape from front to rear on the side surface of the blade so that the blade will retain its shape after sharpening.

While the invention has been described in connection with a particular machine embodiment and in connection with several specific processes for relief-grinding face-mill cutter blades, it will be understood that the machine is not restricted to use with the various processes described. This application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for relieving face-mill cutter blades whose side surfaces have different inclinations to the cutter axis at different points along their heights, a rotary work support, a rotary tool spindle having its axis inclined to the axis of the work support, a rotary tool mounted on the tool spindle and having an axial profile which is of different inclination to the tool axis at different points in the height of the profile, means for rotating the work support, means for rotating the tool spindle, and means for effecting a relative reciprocatory movement between the tool spindle and work support axially of the tool spindle and in time with the rotation of the work support once for each blade to be relieved during each revolution of the work support, the forward portion of each reciprocatory movement serving in conjunction with the rotation of the work support to effect relieving of a blade surface and the return portion of each reciprocatory movement serving to reposition the tool and work support relative to one another ready for the relieving of the next blade.

2. In a machine for relieving face-mill cutter blades, a rotary work support, a pair of rotary tool spindles, rotary tools mounted thereon to relieve, respectively, the outside and inside surfaces of cutter blades, means for adjusting the tool spindles angularly to incline their axes to the axis of the work support, means for rotating the work support on its axis, means for rotating the tool spindles on their respective axes, and means for reciprocating each tool spindle axially in its angularly adjusted position in time with the rotation of the work support and once for each blade to be relieved on each revolution of the work support to effect relief of a side surface of a blade on axial movement of a tool spindle in one direction and to reposition the tool spindle for relieving of the next blade on axial movement of the tool spindle in the opposite direction.

3. In a machine for relieving face-mill cutter blades whose profiles are of varying inclination to the cutter axis at different points in the blade height, a rotary work support, a blade carrying head secured thereto and having the blades carried thereby tipped forwardly out of cutting position, a rotary tool spindle having its axis inclined to the axis of the work support, a rotary grinding wheel secured to said tool spindle and having a profile of varying inclination to its axis, means for rotating the work support on its axis, means for rotating the tool spindle on its axis, and means for reciprocating the tool spindle axially in time with the rotation of the work support once for each blade to be relieved on each revolution of the work support so as to effect relief of successive blades of the cutter.

4. In a machine for relieving side surfaces of blades of a spherical face-mill gear cutter, a rotary work support, a blade carrying head secured thereto and having the blades carried thereby tipped forwardly out of cutting position, a rotary tool spindle having its axis inclined to the axis of the work support, a rotary grinding wheel secured to the tool spindle and having an active surface of circular arcuate profile in an axial plane, means for rotating the work support on its axis, means for rotating the tool spindle on its axis, and means for reciprocating the tool spindle axially in time with the rotation of the work support.

5. In a machine for relieving face-mill gear cutter blades, a rotary work support, a rotary tool spindle having its axis inclined at an angle to the axis of the work support, a rotary tool secured to said tool spindle, means for rotating the work support continuously, means for rotating the tool spindle, a cam having an operative connection with the tool spindle, means for rotating the cam continuously in time with the rotation of the work support to reciprocate the tool spindle axially in time with the rotation of the work support and once for each blade to be ground per revolution of the work support, and means for varying the stroke of the tool spindle.

6. In a machine for relieving face-mill gear cutter blades, a rotary work spindle, a rotary tool spindle, a rotary tool secured to said tool spindle, means for rotating the work spindle, means for rotating the tool spindle, and means for axially reciprocating one of said spindles comprising a bar having an operative connection with said spindle, a rotary cam, a second bar having an operative connection with said cam, means for connecting the two bars so that they may be adjusted bodily together in parallelism about fixed axes to vary the stroke of said spindle, and means for rotating said cam in time with the rotation of the work spindle.

7. In a machine for relieving face-mill gear cutter blades, a rotary work spindle, a rotary tool spindle, a rotary tool secured to said tool spindle, means for rotating the work spindle, means for rotating the tool spindle, and means for axially reciprocating one of said spindles comprising a bar having an operative connection with said spindle, a pair of parallel supports pivotally connected to said bar, a pivoted arm slidably adjustable with reference to each of said supports, a second bar pivotally connected to said arms, a cam mounted to have a peripheral contact with said second bar, and means for rotating said cam in time with the rotation of the work spindle.

8. The method of relieving the side surfaces of face-mill gear cutter blades whose side surfaces have different inclinations to the cutter axis at different points along their heights, which comprises mounting the blades in a rotary head so that they are arranged circularly about the axis of the head and extend in the general direction of said axis, engaging a rotary grinding wheel, whose profile is of different inclination to the axis of the wheel at different points in the height of the profile, with the side surface of a blade to be relieved with the axis of the wheel inclined to the axis of the head at an angle equal to the pressure angle of the side of the blades to be relieved, and rotating the wheel and head on their respective axes while effecting a relative reciprocatory movement between the wheel and head axially of the wheel in time with the head rotation and once for each blade to be relieved on each revolution of the head to relieve the side surface of a blade on the forward portion of each reciprocatory movement and to reposition the wheel and head relative to one another ready for the relieving of a side surface of the next blade on the return portion of each reciprocatory movement.

9. The method of relieving the side surfaces of face-mill gear cutter blades which comprises mounting the blades in a rotary head so that they are arranged circularly about the axis of the head and extend in the general direction of the axis of the head but are offset sidewise from the positions which they occupy during cutting so as to be non-radial of said axis, engaging a rotary grinding wheel, whose profile is of varying inclination to its axis, with the side surface of a blade so that the axis of the wheel is inclined to the axis of the head at an angle equal to the pressure angle of the side of the blades to be relieved, and rotating the wheel and head on their respective axes while reciprocating the wheel axially in time with the head rotation once for each blade to be relieved on each revolution of the head whereby to relieve a side surface of a blade from front to rear on the forward portion of each reciprocatory movement of the wheel and to reposition the wheel ready for relieving the next blade on the return portion of each reciprocatory movement.

10. The method of relieving side surfaces of face-mill gear cutter blades whose profiles have varying inclination to the cutter axis at different points in the blade height, which comprises mounting the blades in a rotary head so that they are arranged circularly about the axis of the head and extend in the general direction of said axis but are offset sidewise from the positions which they occupy during cutting so as to be non-radial of the axis of the head, employing a rotary grinding wheel whose profile in an axial plane is similar to the profile of the blade surfaces to be relieved and has a varying inclination to the wheel axis at different points in its height, engaging said wheel with the side surface of a blade, and rotating the wheel and head on their respective axes while reciprocating the wheel in the direction of its axis in time with the head rotation and once for each blade to be ground on each revolution of the head.

11. The method of relieving side surfaces of face-mill gear cutter blades whose profiles have varying inclinations to the cutter axis at different points in the height of a blade, which comprises mounting the blades in a rotary head so that they are arranged circularly about the axis of the head and extend in the general direction of said axis but are offset sidewise from the positions which they occupy during cutting so as to be non-radial of the axis of the head, employing a rotary grinding wheel whose profile in an axial plane is similar to the profile of the blades to be relieved and has varying inclination to the wheel axis at different points in its height, engaging said wheel with the side surface of a blade with the axis of the wheel inclined to the axis of the head and lying in the same plane as the axis of the head, and rotating the wheel and head on their respective axes while reciprocating the wheel in the direction of its axis in time with the head rotation and once for each blade to be ground on each revolution of the head.

ERNEST WILDHABER.